United States Patent
Eppert

(10) Patent No.: US 7,159,945 B2
(45) Date of Patent: Jan. 9, 2007

(54) DETENT FITTING FOR A VEHICLE SEAT, ESPECIALLY FOR A SEAT OF A MOTOR VEHICLE

(75) Inventor: Dietmar Eppert, Remscheid (DE)

(73) Assignee: Keiper GmbH & Co., Kaiserslautern (DE)

( * ) Notice: Subject to any disclaimer, the term of this patent is extended or adjusted under 35 U.S.C. 154(b) by 105 days.

(21) Appl. No.: 10/149,480

(22) PCT Filed: Dec. 14, 2000

(86) PCT No.: PCT/EP00/12735

§ 371 (c)(1),
(2), (4) Date: Jun. 11, 2002

(87) PCT Pub. No.: WO01/44010

PCT Pub. Date: Jun. 21, 2001

(65) Prior Publication Data

US 2003/0080600 A1 May 1, 2003

(30) Foreign Application Priority Data

Dec. 17, 1999 (DE) ............................... 199 60 878

(51) Int. Cl.
*B60N 2/235* (2006.01)
(52) U.S. Cl. .................................................. 297/367
(58) Field of Classification Search ................. 297/367
See application file for complete search history.

(56) References Cited

U.S. PATENT DOCUMENTS

| | | | |
|---|---|---|---|
| 3,953,069 A | 4/1976 | Tamura et al. | |
| 3,958,828 A * | 5/1976 | Ishida et al. | ............. 297/361.1 |
| 4,660,886 A | 4/1987 | Terada et al. | |
| 4,995,669 A | 2/1991 | Croft | |
| 5,522,643 A | 6/1996 | Matsuura | |
| 5,788,330 A | 8/1998 | Ryan | |
| 6,007,153 A * | 12/1999 | Benoit et al. | .......... 297/378.12 |
| 6,082,821 A * | 7/2000 | Baloche et al. | ........ 297/354.12 |
| 6,095,608 A * | 8/2000 | Ganot et al. | ................. 297/367 |
| 6,106,067 A * | 8/2000 | Zhuang et al. | ........... 297/361.1 |
| 6,112,370 A * | 9/2000 | Blanchard et al. | ............. 16/325 |
| 6,199,953 B1 * | 3/2001 | Chen | .......................... 297/367 |

* cited by examiner

*Primary Examiner*—Peter M. Cuomo
*Assistant Examiner*—Joe Edell
(74) *Attorney, Agent, or Firm*—Friedrich Kueffner

(57) ABSTRACT

The invention relates to a detent fitting that is provided with a solid fitting component (10) appurtenant to the seat component and a fitting component (12) appurtenant to the backrest. The fitting component (12) is pivotably mounted in relation to said first component (10). At least one lock (17) is provided on a fitting component and said lock, together with the remaining fitting component, can be brought into or removed from a locking position in the radial direction. The lock, together with transmission members, forms a backrest adjustment device (17, 20, 21) which engages with an operating lever (27). The aim of the invention is to pivot the backrest towards the front and to bring back said backrest into the position of inclination that has been adjusted before. A memory device (30, 31, 34, 37; 34, 65, 66) and a self-pivoting device (43, 47; 64, 70, 71) that can be released by a separate operating element (45) are assigned to the backrest adjustment device (17, 20, 21).

33 Claims, 13 Drawing Sheets

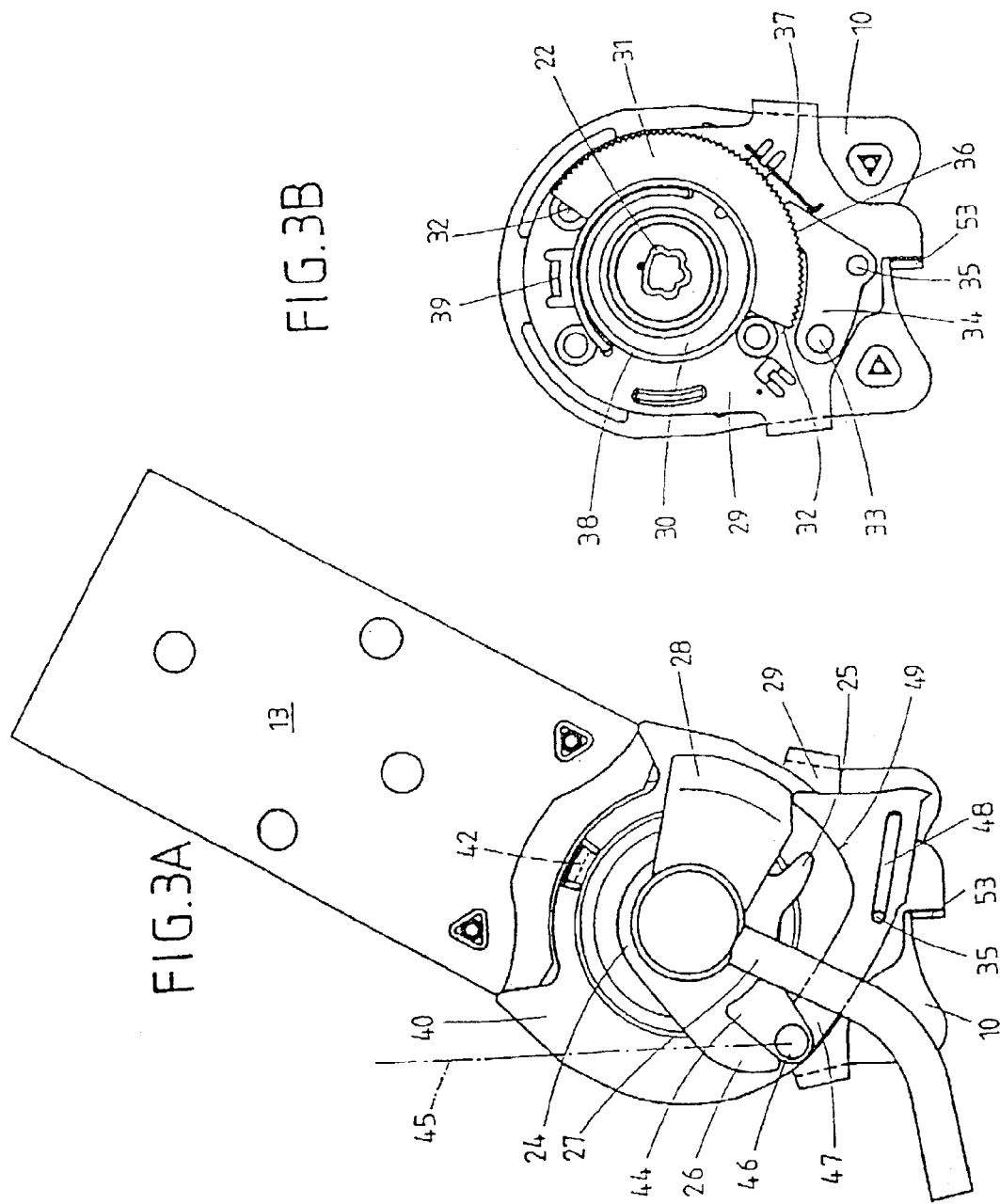

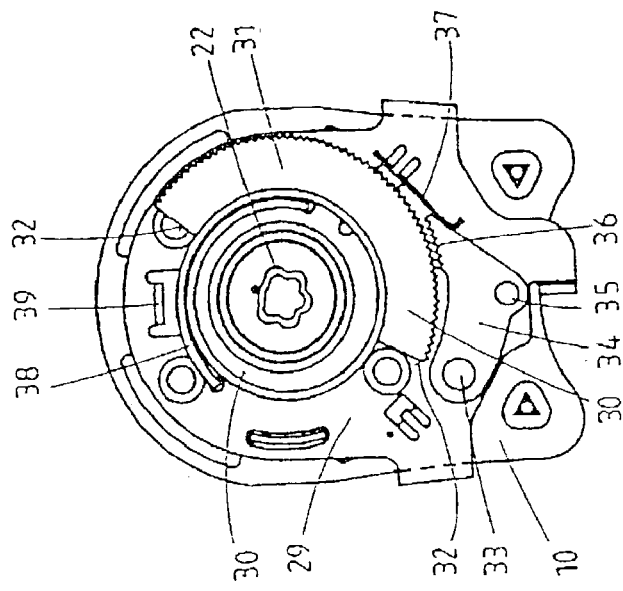
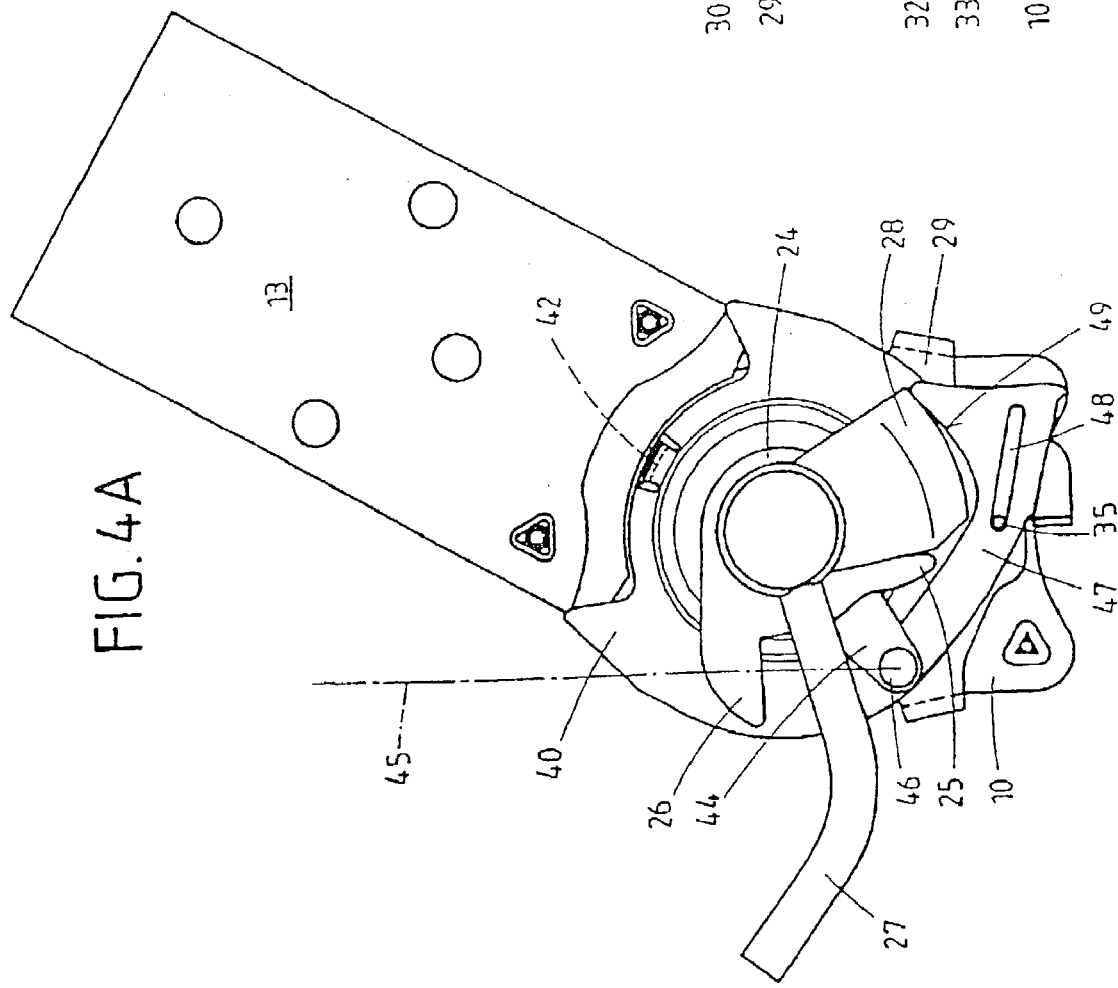
FIG.4B
FIG.4A

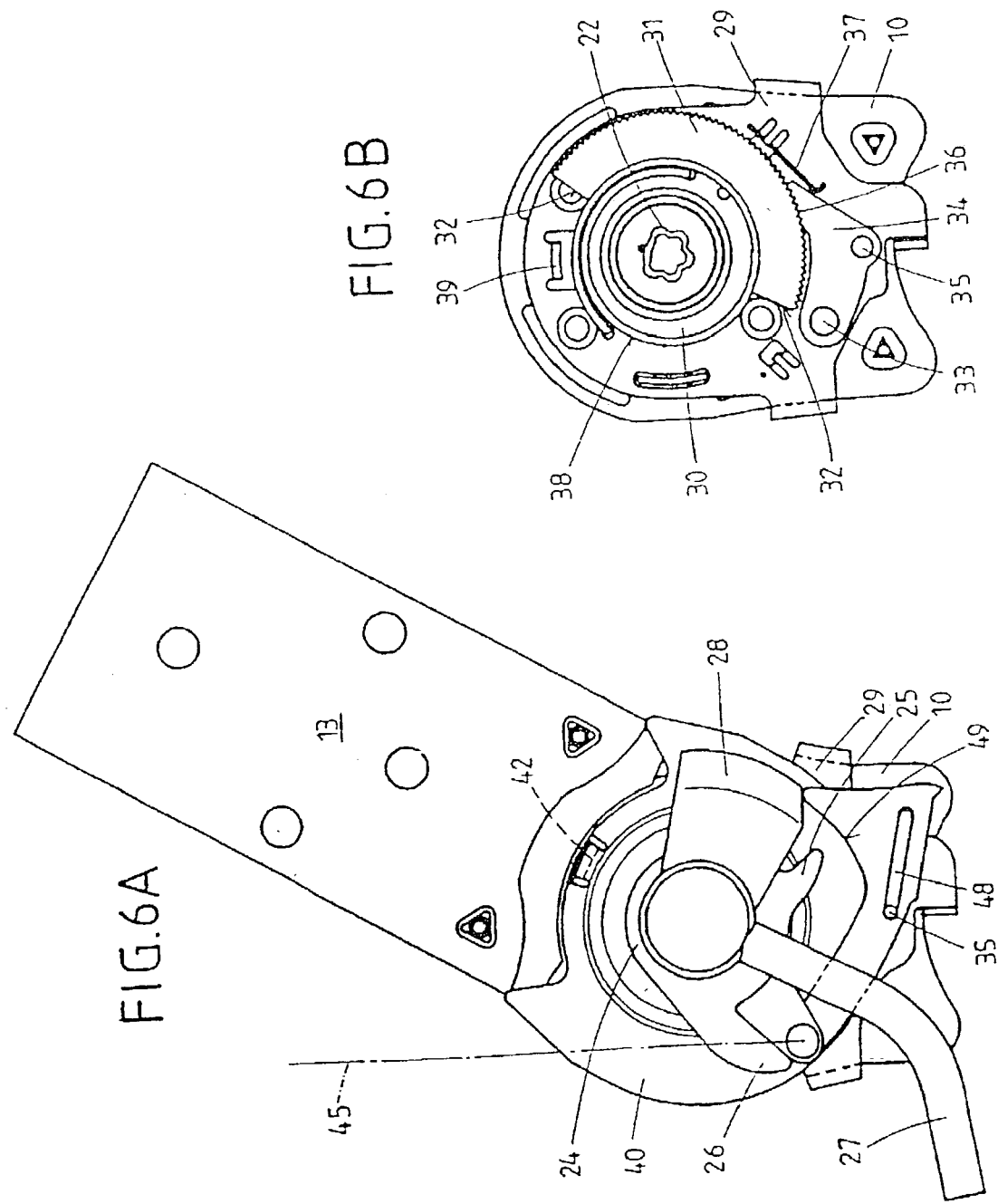

DETENT FITTING FOR A VEHICLE SEAT, ESPECIALLY FOR A SEAT OF A MOTOR VEHICLE

The invention pertains to a detent fitting for a vehicle seat, especially for a seat of a motor vehicle, with a stationary fitting component belonging to the seat part and a second fitting component which belongs to the backrest but which is supported in such a way that it can pivot with respect to the stationary fitting component, where at least one locking bolt is provided on one of the fitting components, which bolt can be brought into and out of the locking position with respect to the other fitting component and which cooperates with transmission elements to form a backrest adjusting mechanism, which is in working connection with an actuating lever.

The applicant's own DE 199 04 300.0, for example, describes a detent fitting for vehicle seats, in which the stationary component of the fitting belonging to the seat has guide shoulders, between which two diametrically opposing locking bolts can be shifted in the radial direction. These guide shoulders and also the bolts are surrounded by an internally-toothed, ring-shaped extension of the pivoting component of the fitting, which is connected to the backrest; in this design, neither the mechanism which allows the backrest to pivot freely nor the memory device needs to be overdimensioned. In a special exemplary embodiment of the invention, the memory device and the free-pivoting mechanism can be attached as a single unit to the outside surface of the fitting component, which means that it is possible to upgrade the detent fitting at any time, even after its original installation. For example, if the first component of the detent fitting has already been installed and then it is suddenly specified that detent fittings with the mechanism and device according to the invention are required, the new component can still be installed. The modular design of the invention means that installation can be completed easily and at favorable cost.

For the purpose of setting the memory device, the device is made up of a stop disk and a detent pawl, which holds the stop disk in place. The detent pawl, which is rotatably supported and preloaded in the locking direction, can be unlocked by the actuating lever, which also releases the backrest adjusting mechanism. This makes the device easy to operate. It is recommended here that the stop disk be preloaded by an stored-energy device in the forward pivoting direction of the backrest and that the detent pawl be mounted rotatably in a permanent position relative to the stationary fitting component and spring-loaded in the locking direction to make sure that it is easy for the desired position of the memory device to be found.

In an exemplary embodiment of the invention, the actuating lever is connected rotatably to a release adapter, which is connected nonrotatably to the transmission elements of the backrest adjusting mechanism. A release finger, which can be brought into contact with the actuating lever, and a release cog, which can be acted upon by a crank, the crank itself being actuated by the separate operating element, are mounted on the release adapter.

In another exemplary embodiment of the invention, a stop, which can be brought into contact with the release adapter and which serves as a release finger, is mounted nonrotatably on the actuating lever. This stop acts on a crank on the release adapter. The crank can be actuated by the separate operating element and has a driver stud, which acts as a release cog. The desired tilt angle of the backrest can be easily achieved with either of these two possible designs Because of the possibility of simply reversing the arrangement of the release finger and the release cog with respect to each other, both exemplary embodiments allow various possible design solutions.

The release adapter ensures that, when the actuating lever executes a release movement and the locking bolts of the backrest adjusting mechanism are thus released, the detent pawl is also disengaged from the stop disk of the memory device. As a result, the backrest can be moved to the desired tilt angle, and the stop disk of the memory device can accompany this movement and arrive in the desired backrest position also.

If only the separate operating element is actuated, however, without the actuating lever itself being released, the detent pawl is not disengaged, which means that the stop disk remains in its set position. Therefore, the backrest can be pivoted back again to the previously set backrest tilt angle, as long as the separate operating element is held in its released position. So that the release adapter can be moved by the actuating lever, however, it is advantageous for the actuating lever to have a control projection, which, during the release movement, moves a rocker, hinged to the crank, in the direction which releases the detent pawl, which is in working connection with the rocker. This working connection of the detent pawl can be achieved by providing the detent pawl, which is pivotably mounted on a base plate connected to the stationary fitting component, with a stud, which engages with a connecting element on the rocker; for its own part, the rocker has a radial cam, via which the control projection of the actuating lever releases the detent pawl as the lever performs its release stroke. To prevent the stop disk from arriving in a position beyond the range where it can engage with the detent pawl after the detent pawl is released, the base plate has a retaining projection for limiting the extent to which the stop disk can pivot in the forward direction under the action of its spring loading.

A protected arrangement of detent pawl and stop disk is advantageously obtained by installing the detent pawl, which is supported on the base plate; the stop disk, which is held by the pawl in the locked position; and the stored-energy device, which is designed as an annular spring to preload the stop disk, in an empty space formed between the base plate and a cover plate, where the cover plate is connected to the pivoting component of the fitting belonging to the backrest. The cover plate advantageously has a stop, projecting into the pivoting path of the stop disk, so that, when the backrest is being pivoted backward, the stop disk can be carried along rotationally against the preload exerted on it by the stored-energy device and thus moved to the desired tilt angle for purpose of setting the memory. In an advantageous design of the memory device, the stop disk is provided with an externally toothed locking segment. The radially inward pointing end surfaces of this segment form contact shoulders for the retaining projection of the base plate on one side and for the stop of the cover plate on the other.

In a particular exemplary embodiment of the invention, the backrest adjusting mechanism can be unlocked by the movement of both the actuating lever and the operating element. As a result of this measure, it is ensured that both detent fittings are free to move when the backrest is to pivot freely or when its position is to be adjusted. The backrest can thus be easily adjusted without the need to provide the second detent fitting with an actuating lever for the backrest adjustment or with an operating element to allow the backrest to pivot freely. It is advantageous for the memory device to consist of a locking disk and a link disk, which controls the detent pawl; the locking disk is able to move along with the pivoting component of the fitting. As a result of these measures, the memory device according to the invention is simple to construct and simple to install, and in particular the memory device can be easily designed and actuated.

It is recommended that the pivoting movement of the detent pawl be controlled by way of a rotating link disk; in this case, a stud mounted remotely from the support point of the detent pawl engages in a link guide provided on the link disk, so that, when the link disk rotates, it is easy for the detent pawl to pivot; in particular, the detent pawl can easily be guided toward the locking disk and its teeth It is advantageous for the link disk and a disk cam with the pivot support point for the detent pawl to be held under tension in opposite directions with respect their rotational movement by a spring. Because the spring pulls the two disks in opposite rotational directions, the detent pawl can return automatically to the locking disk.

It is favorable for the actuating lever to carry a nonrotating intermediate element, which has a projection which engages in an arc-shaped opening in an extension of the release adapter, so that it can carry this adapter along with it as it rotates; it is also favorable for the intermediate element to have a stop, which moves a driver lever, which for its own part rotates the link disk upon actuation of the actuating lever. As a result of the concomitant movement of the release adapter—at both detent fittings of the seat—the backrest is released for adjustment, and thus, by the rotation of the link disk, the backrest can be set to a new tilt angle.

In a particular exemplary embodiment of the invention, locking means are provided which, starting from a home position, release either only the mechanism allowing the actuating movement for the memory device or only the mechanism allowing the backrest to pivot freely. The device actuated first has priority. These locking means make it impossible for both levers to be operated simultaneously by accident, which could make it difficult for the user to adjust the angle of the backrest.

It is especially favorable for the pivoting driver lever, which can occupy any one of three different positions (two locking positions and one home position), to block only one function when in one of its two locking positions, i.e., either the movement of the free-pivoting mechanism or the adjusting movements of the memory device, whereas, when the lever is in the home position, either the free-pivoting mechanism or the memory device can be actuated. Thus the use of a simple driver lever makes it is possible to either of the two mechanisms without fear of operating difficulties.

It is recommended here that the driver lever be supported with freedom to pivot on a retaining stud forming part of the fixed component of the fitting, so that the driver lever can be controlled and moved with precision. In a special exemplary embodiment, the driver lever is designed as a angled lever with two sidepieces, one of which blocks the movement of the free-pivoting mechanism, while the other sidepiece blocks the movement which actuates the memory device. The design of this angled lever reduces the complexity of the detent fitting, because only a simple rotation of the lever is required; the mechanism therefore operates reliably and is very user-friendly.

In a special exemplary embodiment of the invention, three rotatable disks are provided to control the free-pivoting mechanism and the memory device. These disks, namely, a disk cam, a locking disk, and the link disk, are mounted axially next to each other on the rotational axis of the backrest. The locking disk is attached nonrotatably to the pivoting component of the fitting and is provided around its periphery with teeth, in which a toothed claw mounted on a pivoting detent pawl engages. One on side, the disk cam carries a bearing journal for the detent pawl, and on the other side it has a tooth-shaped opening, in which a tooth of a locking catch, which can pivot around a retaining stud on the fixed fitting component, engages. The link disk is equipped with a link guide, into which a stud the detent pawl engages. The link disk and the disk cam are able to rotate in opposite directions under spring tension. In this embodiment, the essential parts of the memory device, of the free-pivoting mechanism, and of the backrest adjusting device are situated adjacent to each other on the same axis, which ensures that the mechanism functions with precision and that it can be operated reliably. In particular, it also means than an existing mechanism can be easily upgraded with the new components. The parts mentioned can be designed in modular fashion, so that the device can be easily attached. Every time the backrest is pivoted, the user is always able to return the backrest to the angle which he has selected as best for him.

It is advantageous for the link disk to have an elevation, against which a stop on the driver lever comes to rest, so that, when the driver lever is moved, the link disk is rotated with respect to the disk cam under spring tension. This arrangement makes it easier to adjust the memory device and also improves its design.

It is advantageous for the tooth of the blocking lever to rest elastically on the circumferential surface of the disk cam during the freely pivoting movement which is possible upon release of the operating element, because then only simple pivoting is required; that is, there is no need to actuate the operating element simultaneously. When the mechanism is pivoted back in the other direction, the tooth of the blocking lever automatically returns to the tooth-shaped opening in the disk cam, which presents no problem to the user. When the tooth engages, the user knows that the backrest has been returned to the desired angle.

If it is desired to pivot the backrest in the other direction, the operating element can be held or re-actuated to prevent the tooth from engaging in the opening. In addition, the spring-loading of the tooth means that the tooth will always engage automatically and reliably in the tooth like opening when this is desired.

It is recommended that the locking catch be provided with a retaining stud, to which a coupler, which can be actuated by a release lever, is hinged for the release of the backrest for free pivoting; in this case, the retaining stud also serves as a stop for the second sidepiece of the angled lever to block the movement of the locking catch upon initiation of an adjusting movement of the backrest. This again ensures that the free-pivoting mechanism and the backrest adjusting device will operate reliably.

It is favorable for the pivoting locking catch and the driver lever to be held against each other by the force of a spring to obtain a defined home position for the driver lever.

It is also advantageous for the driver lever to have a guide surface, with which the stop of the actuating lever can come into contact when it moves, so that the movement required for the backrest adjustment can be initiated.

It is recommended that the actuating lever have a stop, so that, when the actuating lever moves, the stop will pivot the driver lever, which will in turn rotate the link disk for the tilt adjustment. At the same time, the projection on the intermediate lever moves the actuating lever and the release adapter to release the backrest adjusting device.

When the backrest of the motor vehicle seat is in the freely-pivoting state, it is provided in a special exemplary embodiment of the invention that, by exerting force on the operating element, the backrest can be moved beyond the selected memory setting and to any point within its pivot range. Thus, if the backrest is not to be returned immediately to the desired tilt angle, it is possible to pivot the backrest from the front all the way to the back or from the back all the way to the front. The backrest will return to the desired tilt angle only after the operating element has been released.

The invention is illustrated in the drawing on the basis of an exemplary embodiment and is explained in greater detail below:

FIG. 3A shows an external view of the detent fitting before the release of the actuating lever, where the fitting component belonging to the backrest is at an angle suitable for allowing the user to become seated;

FIG. 3B shows the detent fitting according to FIG. 3A after the cover plate has been take away and after the actuating lever, the release adapter, the rocker, and the crank have been removed, the stop disk being in the defined memory position;

FIG. 4A shows the detent fitting shown in FIG. 3A, but here the actuating lever has been pivoted into the release position for the beginning of a forward pivoting movement;

FIG. 4B shows the detent fitting according to FIG. 4A, where again the cover plate, the actuating lever, the release adapter, the rocker, and the crank have been removed, and where the rocker has been pushed to unlock the stop disk;

FIG. 6A shows the detent fitting again at a tilt angle suitable for allowing the user to become seated, before the separate operating element has been actuated to carry along the release adapter and allow the forward-pivoting movement, the stop disk of the memory device remaining in its locked position;

FIG. 6B shows the hinge fitting according to FIG. 6A, again after the cover plate has been taken off and the actuating lever and the release adapter have been removed, where the stop disk is locked in its preset memory position;

Figure 1:
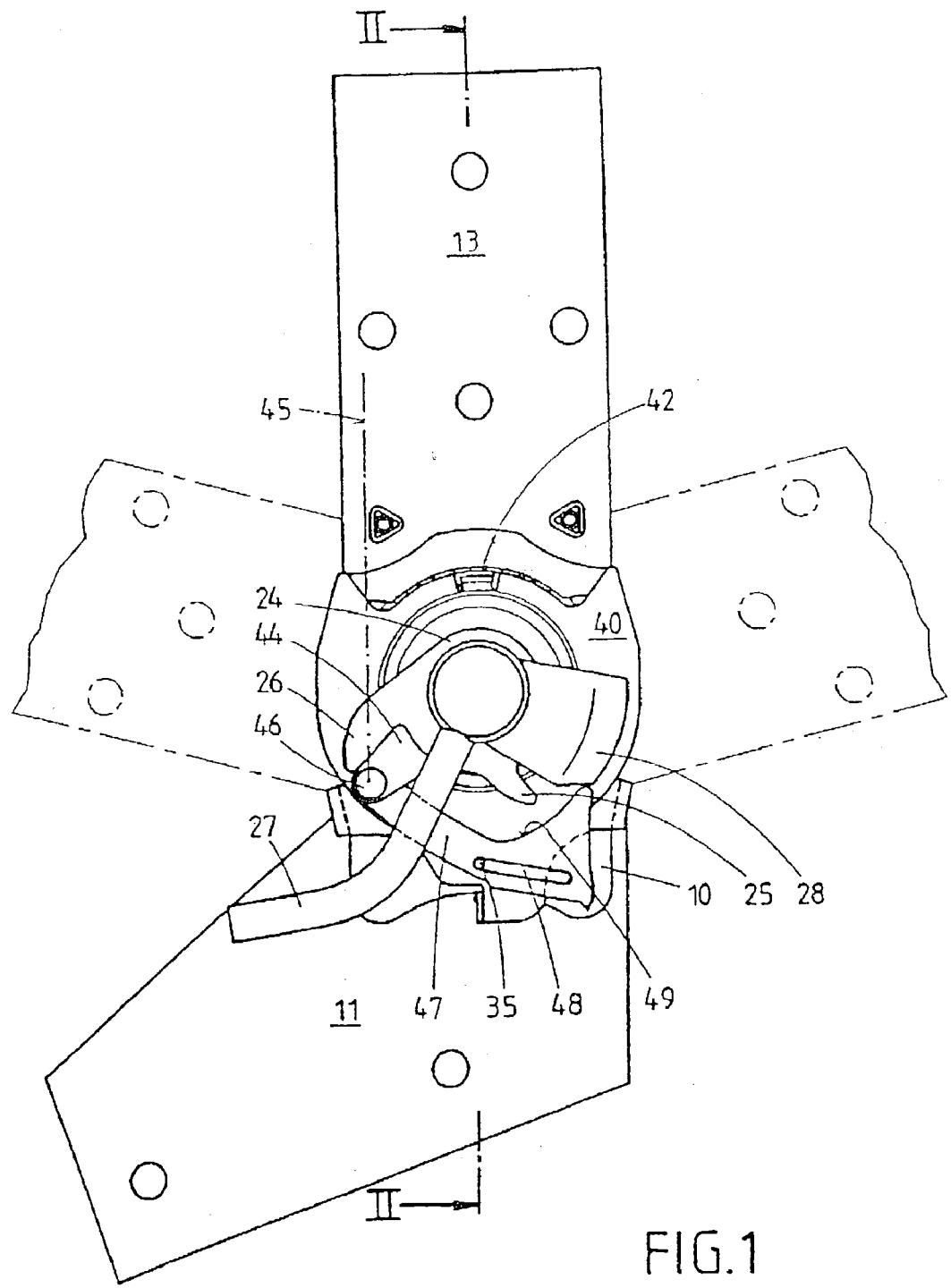
FIG. 1 shows an external view of the detent fitting.
Figure 2A:
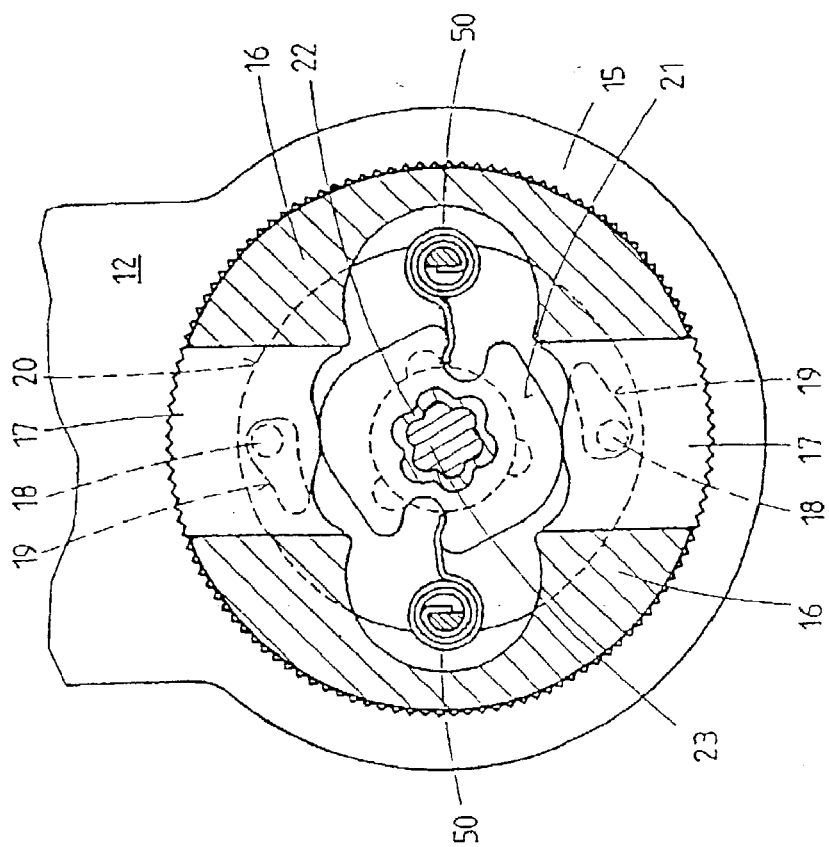
FIG. 2A shows a cross section of the detent fitting along line IIA—IIA of FIG. 2.
Figure 2:
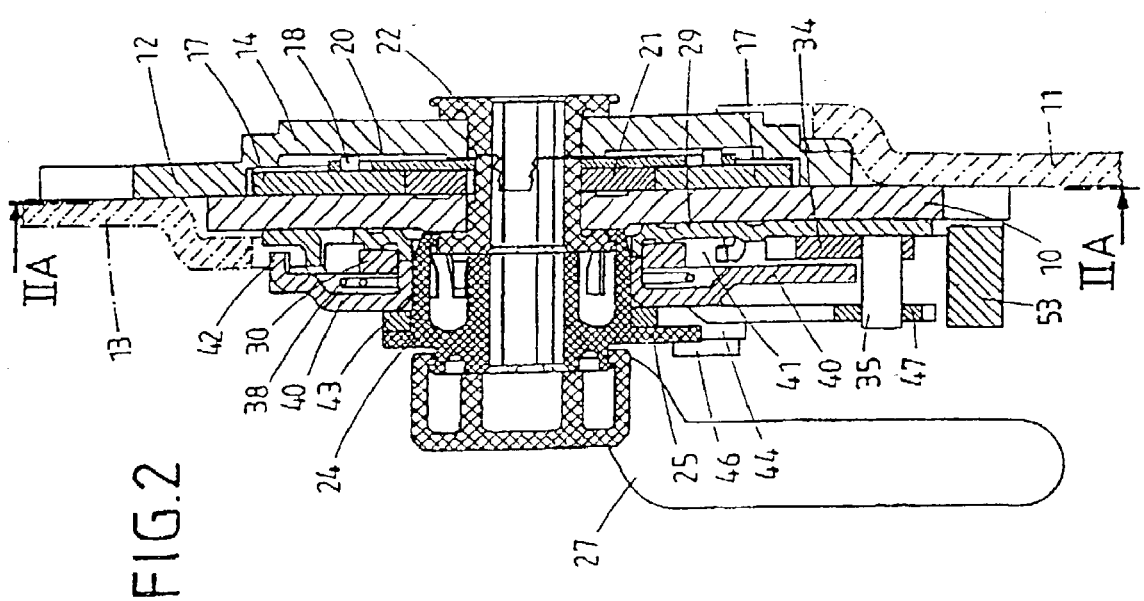
FIG. 2 shows a longitudinal section through the detent fitting of FIG. 1 along line II—II of FIG. 1.

As can be seen most easily in FIGS. 1 and 2, the stationary component 10 of the fitting is connected to an attachment plate 11, which can be connected in turn to the frame of the seat part of the vehicle seat (not shown). A pivoting component 12, belonging to the backrest, is supported on this stationary component 10; the pivoting component is itself fastened to the backrest of the vehicle seat (not shown either), also by way of an attachment plate connected to the fitting component 12.

The piloting component 12 of the fitting has an internally toothed ring-shaped extension 15, produced by pressing a supporting ring 14; this ring-shaped extension is supported on the periphery of guide shoulders 16 of the stationary component 10, which have been extended to form a circle. In the case of the exemplary embodiment best seen in FIGS. 2 and 2A, these guide shoulders 16 are interrupted by diametrically opposing openings, in which two externally toothed locking bolts 17 are guided. A control stud 18 emerges from the wide side of each of these locking bolts 17, and each control stud 18 is enclosed by a control slot 19 of a driver disk 20. The radially inward-facing surfaces of the locking bolts 17 are pressed into the locking position by a spring-loaded cam disk 21, as long as the cam disk is not being pivoted backwards against the effect of the spring elements 50, which exert force on the disk in the locking direction. Both the driver disk 20 and the cam disk 21 are held together axially with the fitting components 10 and 12 by a collar bushing 22, which is divided into two parts in the longitudinal direction. In the area of the driver disk 20 and the cam disk 21, the collar bushing has a driver profile on its outside surface, with which the driver disk 20 and the cam disk 21 engage in a form-locking manner. This collar bushing 22 is also profiled around its internal circumference and accepts a transmission rod 23 (FIG. 2A), which, if needed, connects the detent fitting on one of the long sides of the seat with the fitting on the other long side of the seat. The locking bolts 17, together with the driver disk 20 and the cam disk 21, form the primary components of the backrest adjusting mechanism.

The collar of the collar bushing 22 extends over a certain part of the external surface of the detent fitting in the central area; a bushing-shaped release adapter 24 adjoins this collar and is rotatably supported on it; and the inner circumference of the hub of this adapter is profiled in the same way as the inner circumference of the collar bushing 22. This release adapter has a radially projecting release finger 25 on one side and a radially projecting release cog 26 on the other, a certain distance away from the finger in the circumferential direction; the function of this release cog is described further below. An actuating lever 27 is attached to a ring-like latching projection on the outside surface of the release adapter 24; the lever is supported so that it can rotate freely and has a control projection 28, which is bent in a crank-like manner into the plane of the release finger 25 (FIGS. 1 and 2). The collar bushing 22, the transmission rod 23, and the release adapter 24 form secondary components both of the backrest adjusting mechanism and also of the free-pivoting mechanism.

A base plate 29 is attached to the outside surface of the stationary component 10; a stop disk 30 is supported on the base plate, concentric to the collar bushing 22; the stop disk has an externally toothed locking segment 31; the two ends of this segment extent radially inward and continue around to form the ring-shaped area of the stop disk 30 by which the stop disk is rotatably supported on the base plate 29. A bearing journal 33 projects from the lower part of the base plate and serves to support the detent pawl 34 so that it is free to pivot. This detent pawl 34 has a projecting stud 35 on one side, by which it can be activated, and is provided on the other side with a toothed claw 36, which can engage in the teeth of the locking segment 31; the claw is held in the engaged position by a leaf spring 37, attached to the base plate 29. The stop disk 30 is preloaded by an stored-energy device in the forward-pivoting direction, this device being formed by an annular spring 38, one end of which is attached to the base plate 29, while the other end acts on the stop disk 30. In its upper part, the base plate 29 also has a retaining projection 39, projecting away from the fitting component 10; this projection extends into the path along which the locking segment 31 of the stop disk 30 pivots and thus limits the extent to which the disk can pivot toward the front. The stop disk 30, the detent pawl 34 with the leaf spring 37 acting on it, and the annular spring 38 form the primary components of the memory device and are covered by a cover plate 40, which is attached to the pivoting component 12 belonging to the backrest, where, between the base plate 29 and the cover plate 40, an empty space 41 is formed, in which the primary components of the memory device are housed. The cover plate 40, which is connected to the pivoting component of the fitting, has for its own part a stop 42 at its summit, facing the connecting plate 13 for the backrest; this stop is formed by bending a section of the cover plate 40 inward at an angle, and it also extends into the path along which the locking segment 31 of the stop disk 30 pivots, above the retaining projection 39. The cover plate 40 has an indrawn, collar-like section in its center, by which it is supported on the outside lateral surface of the release adapter 24.

Also mounted on the release adapter 24, between the plane of the release finger 25 and the release cog 26 on one side and the plane of the cover plate 40 on the other, is a crank 43, supported with freedom to rotate. The crank is designed as a ring-shaped disk with a radially projecting driver finger 44, cranked into the plane of the release cog 26. This driver finger 44 is provided at its free end with a hinge point for a separate operating element 45, which consists preferably of a tension rod (indicated in broken line), which, for ease of operation, is extended to the top end of the backrest, where it forms a release lever. A rocker 47 is fastened by a rivet, which forms a rotary joint, to the point of the driver finger 44 of the rocker 43 to which the operating element 45 is attached; the rocker has a slot-like connecting element 48, which receives the stud 35 of the detent pawl 34. Above the connecting element 48 there is a radial cam 49 on the exposed side of the rocker 47; this cam can be contacted by the bottom surface of the control projection 28 of the actuating lever 27 to allow the tilt angle of the backrest to be changed and the stop disk for the memory function to be adjusted. The operating element 45, the crank 43, and the rocker 47 together form the primary components of the free-pivoting mechanism.

Figure 5A:
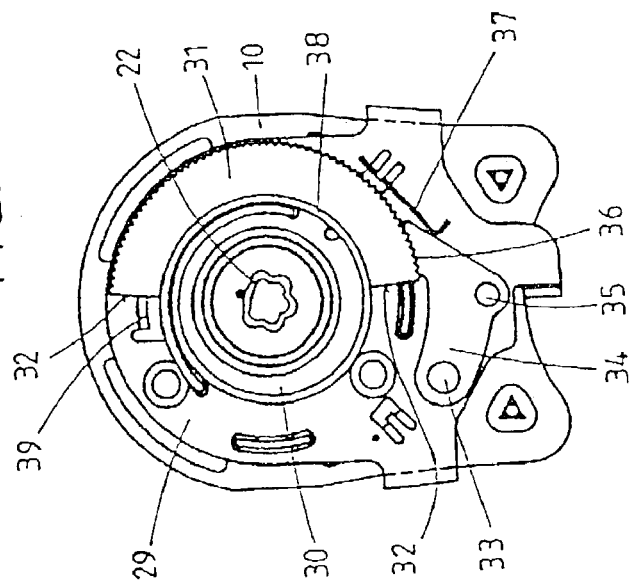
FIG. 5A shows the detent fitting according to FIG. 4A in a new locking position, pivoted slightly forward in comparison to that shown in FIG. 4A.
Figure 5B:
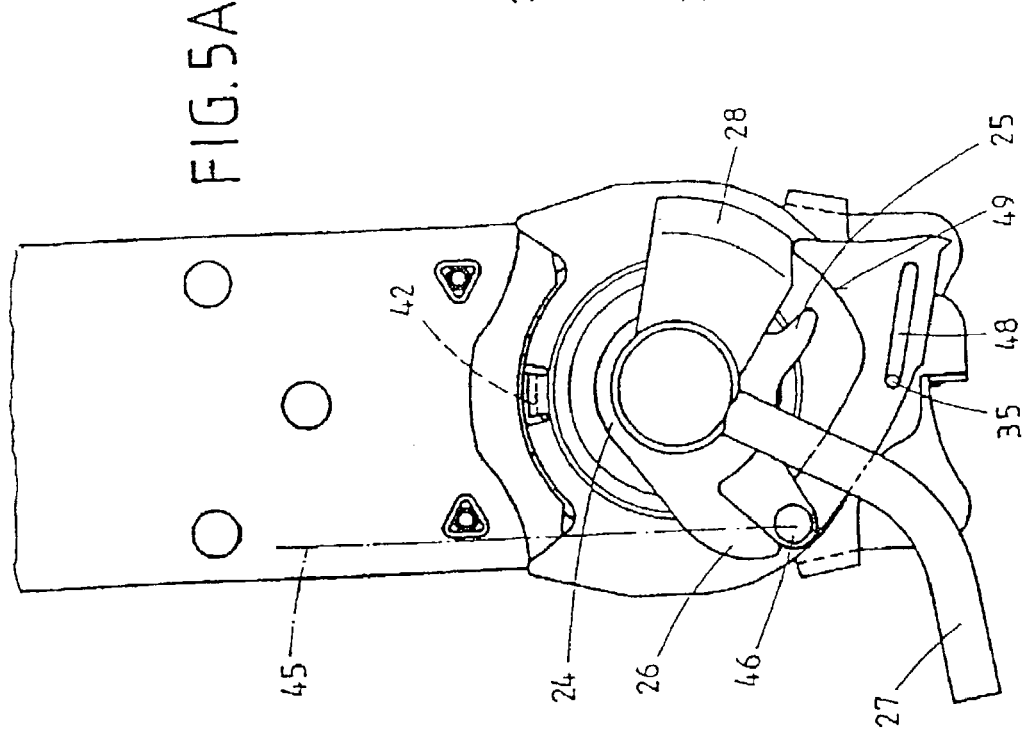
FIG. 5B shows the detent fitting according to FIG. 5A after the cover plate has been taken off and again after the actuating lever and the release adapter have been removed, where, at the tilt angle shown in FIG. 5A, the stop disk has been pivoted against the stop of the base plate by the force of a spring.
Figure 7:
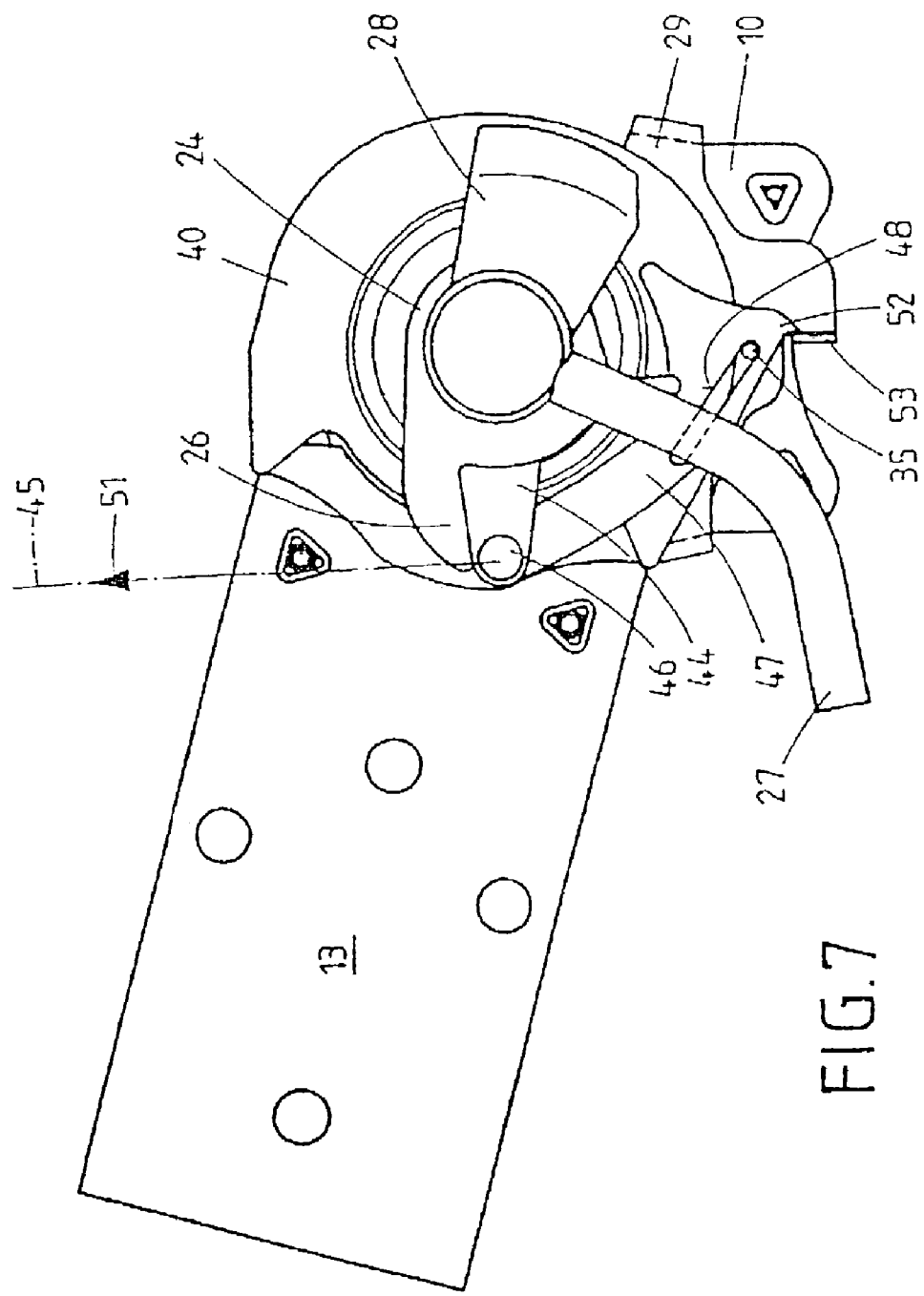
FIG. 7 shows the detent fitting according to FIG. 6A after the fitting component connected to the backrest has been pivoted freely forward.
Figure 8:
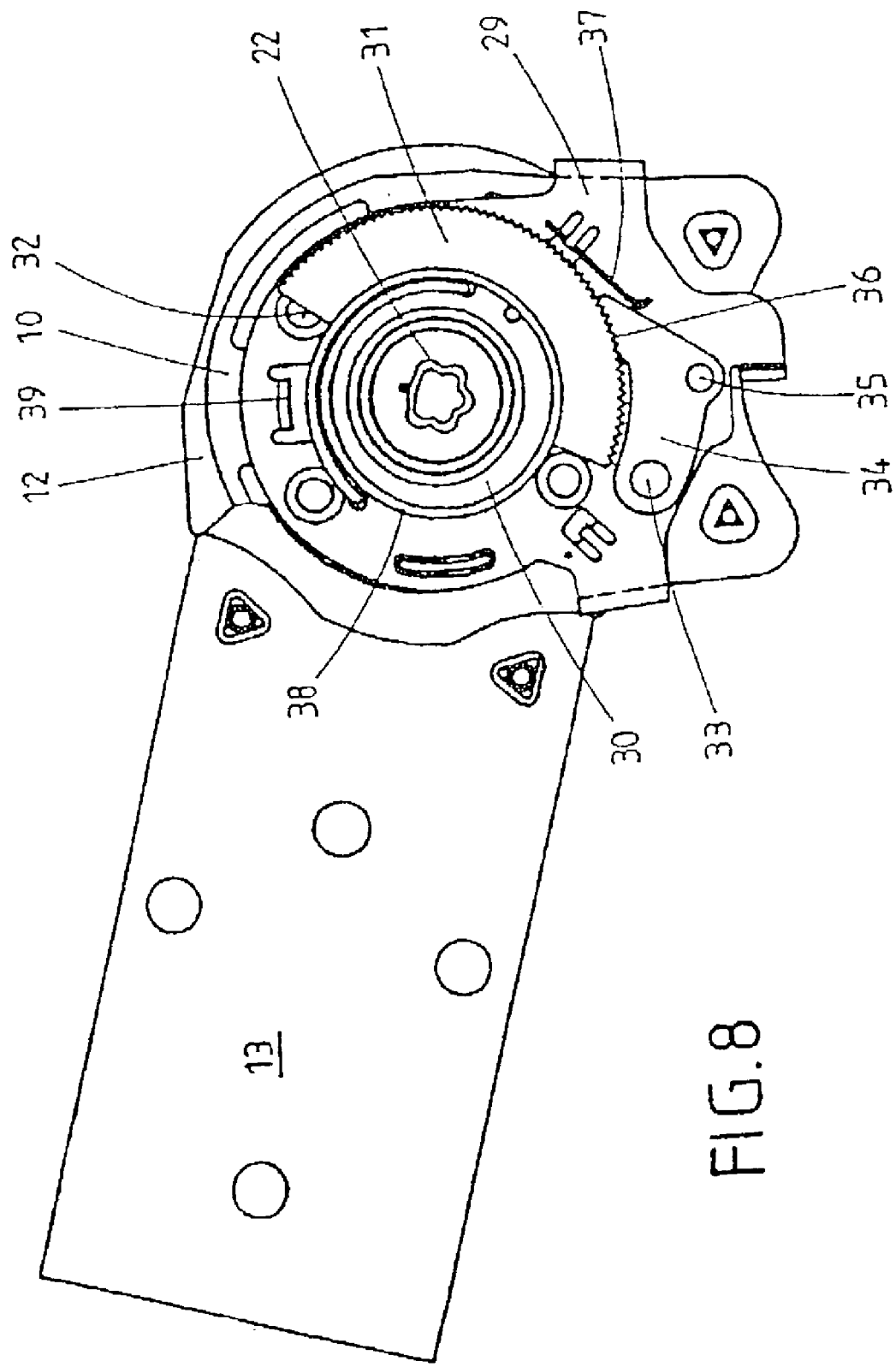
FIG. 8 shows the detent fitting according to FIG. 7 in the freely forward-pivoted position after the cover plate has been taken off and the actuating lever, the release adapter, the rocker, and the crank have been removed, the stop disk being locked in the memory position.

The pivoting component 12, to which the attachment plate 13 and thus also the backrest (not shown) connected to the plate are attached, can be pivoted both forward and back over a range of about 75° from the "6 o'clock" position shown in FIG. 1, as illustrated by the broken lines of the attachment plate 13. When the backrest is at an angle such as that shown in FIG. 3A, for example, the memory device with its stop disk 30 and its detent pawl 34 are in the position shown in FIG. 3B, in which the stop 42 of the cover plate 40 rests against the upper end 32 of the locking segment 31 of the stop disk 30. When the backrest is now to be shifted to a different tilt angle, the actuating lever 27 is first pivoted into the position shown in FIG. 4A. As this happens, the control projection 28 of the actuating lever 27 slides along the radial cam 49 and thus presses the rocker 47 down, as a result of which the stud 35 of the detent pawl 34 in the connecting member 48 is also pushed down. The toothed claw 36 of the detent pawl 34 is thus pulled away from the teeth of the locking segment 31, as can be seen in FIG. 4B. If then, while the actuating lever 27 is held in this released position, the user moves the backrest in one direction or the other, the locking segment 31 of the stop disk 30 follows this movement, because the upper end 32 remains in contact with the stop 42 of the cover plate 40, which pivots along with the component 12. The reason that the fitting component 12 connected to the backrest is able to pivot is that the control projection 28 has also come into contact with the release finger 25 of the release adapter; the release adapter 24 is thus rotated also, and via the transmission rod 23 it is able to rotate the collar bushing 22 as well, which for its own part rotates the cam disk 21 out of the position shown in FIG. 2A and into a neutral position. Simultaneously, the driver disk 20 has also been rotated, so that, via the control slots 19 and the control studs 18, the locking bolts 18 are pulled away from the internal teeth on the ring-shaped extension 15 of the fitting component 12 connected to the backrest. As soon as the user lets go of the actuating lever 27, the spring elements 50 acting on the cam disk 21 cause everything to move back in the opposite direction with respect to the previously described movements, so that, after the backrest has been swung into the position shown in FIG. 5A, for example, it is then locked in this position. The stop disk 30, with its locking segment 31, then assumes the position shown in FIG. 5B. The stop disk 30 cannot be pivoted any farther forward than this to find a memory position, because, in this position, its upper end 32 has come to rest against the retaining projection 39 of the base plate 29.

Figure 9:
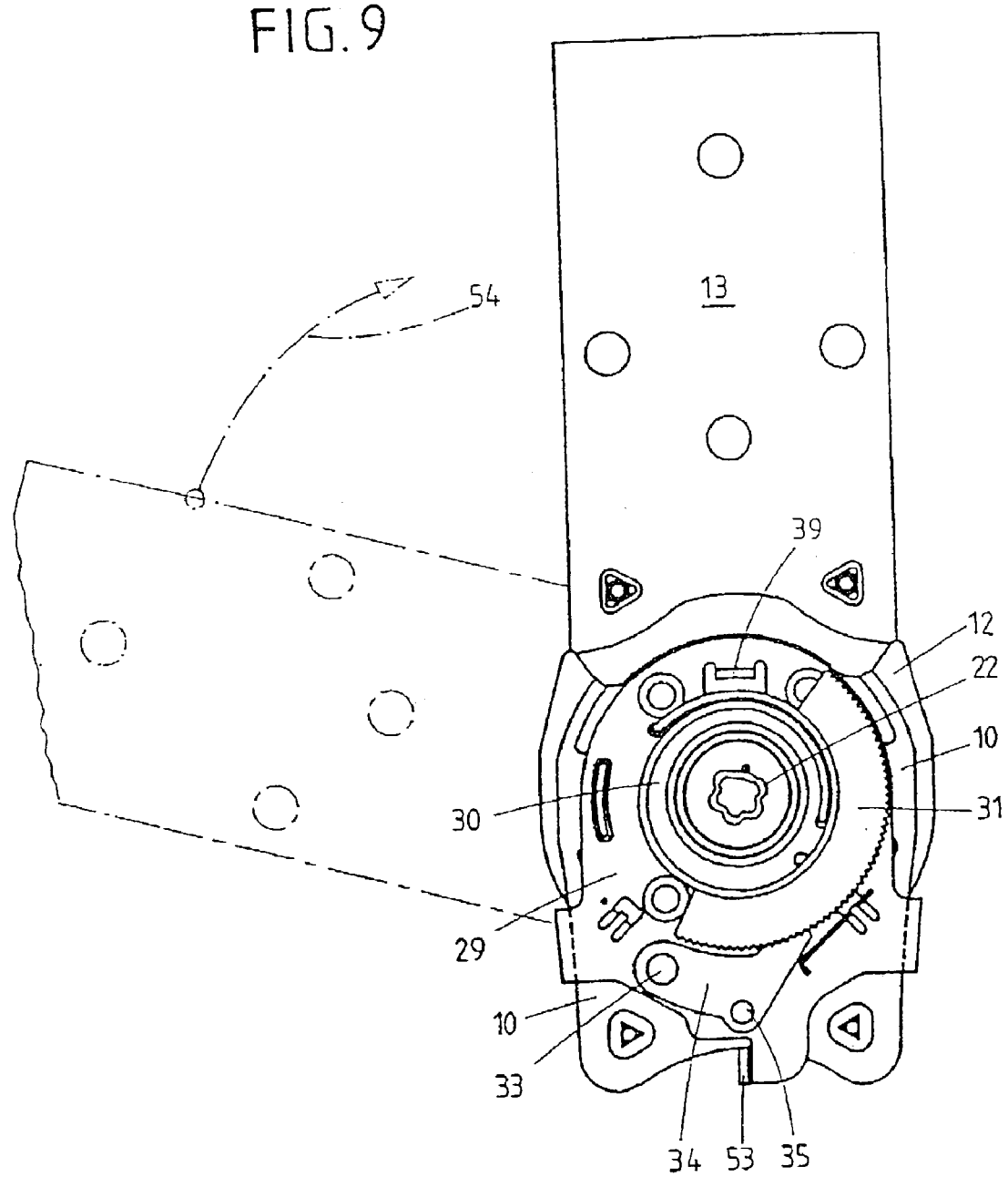
FIG. 9 shows the detent fitting according to FIG. 8, in which the fitting component belonging to the backrest has not reached the backrest tilt angle suitable for sitting but has been locked in the position shown by the letting go of the separate operating element.

Independently of this, however, the backrest can be pivoted freely forward, which is described in the following on the basis of FIGS. 6A–8. Starting from the tilt angle of the attachment plate 13 and thus also of the backrest (not shown) illustrated in FIG. 6A, the entire system is in the latched position. As a result of the previous movement of the stop 42 on the cover plate connected to the pivoting component 12, the stop disk 30 responsible for memory functions has been shifted in this case into the position for the memory function shown in FIG. 6B and has been arrested in this setting. When now, in this position, tensile force is exerted on the operating element 45 in the direction of the arrow 51 in FIG. 7, the driver finger 44 of the crank 43 carries the release cog 26 of the release adapter 24 into the position shown, for example, in FIG. 7, without the actuating lever 27 being moved. During this pivoting movement of the release adapter 24, the bolts 17 are also pulled away from the teeth of the ring-shaped extension 15 of the pivoting component 12 in the manner described above, so that the pivoting component 12 is released and can be pivoted forward into the position shown in FIG. 7. As this happens, the setting of the stop disk 30 does not change; it remains in the position shown in FIGS. 6B and 8. The reason for this is that the connecting element 48 of the rocker 47 slides across the stud 35 of the detent pawl 34. Upon actuation of the crank 43 via the operating element 45, the rocker 47 establishes a form-locking connection, which prevents the detent pawl 34 from being released when load is exerted on the stop angle 53, so that there is no effect on the detent pawl 34. The release stroke of the driver finger 44 belonging to the crank 43 is also limited by the blocking projection 52 of the rocker 47. When the backrest is now swung backward while the operating element 45 remains in the pulled-up position indicated by the arrow 51 in FIG. 7, this backward movement can be continued until the attachment plate 13 and thus also the backrest again occupy the position shown in FIG. 6A. But if, beforehand, as shown by way of example in FIG. 9, the attachment plate 13 is pivoted backward in the direction of the arrow 54 from the forward position shown in dotted line in the FIG. 9 to the position shown in solid line in FIG. 9 (because, for example, the backrest has been blocked from moving back any farther by a bulky object on the rear seat of the vehicle) and then the user lets go of the operating element, the locking shown in FIG. 2A occurs again immediately. Thus the backrest is always locked as soon as the user lets go of the operating element 45 and thus of the crank 43. By renewed actuation of the operating element 45, it is now possible for the backrest to return to the stop position preserved by the memory function and illustrated in FIG. 6A if the backrest is released from its locked state first. This is so because the actuation of the operating element 45 has no effect on the memory function of the stop disk 30. If, however, the user wishes to set the backrest to a different tilt angle, the actuating lever 27 must be brought into the position shown in FIG. 4A, as a result of which, first, the pivoting component 12 is unlocked by the locking bars 17 and, second, the detent pawl 34 is released, so that the spring-loaded stop disk 30 makes contact with the stop 42 of the cover plate 40 permanently attached to the pivoting component 12. When the backrest is pivoted toward the rear, the stop disk will thus follow the movement of this stop 42 over the entire pivoting range but will follow a forward pivoting movement only up as far as the retaining projection 39 of the base plate 29, where it comes to rest.

In the case of the exemplary embodiment of the detent fitting shown in FIGS. 10–13, the fitting consists again of a stationary component 10, which is permanently connected to an attachment plate 11, which is connected in turn to the frame of the seat part of the vehicle seat (not shown). A pivoting component 12 belonging to the backrest is supported on this stationary component 10; the pivoting component for its own part is also attached to the backrest of the vehicle seat (not shown either) via an attachment plate 13, which is fastened to the pivoting component 12.

The backrest adjusting device, the design of which can be derived from the first exemplary embodiment according to FIG. 2A, is provided between the two components of the fitting. The important point here is that the pivoting component of the fitting can be held in place on the stationary component and thus the backrest part held in place with respect to the seat part at any point of the entire pivoting range of the backrest. This adjustment of the backrest and the release must be transmitted via the transmission rod 23 to the second seat fitting also. The adjustment, the release, and the holding in place are accomplished by the rotation of the release adapter 24.

The two components 10, 12 of the fitting are provided with a bore, into Which the two-part collar bushing 22 fits, on the outer circumference of which the stationary and the pivoting fitting components 10, 12 are able to rotate with respect to each other.

The collar bushing 12 has a noncircular internal opening, in which the transmission rod 23, which is tubular in this exemplary embodiment, is held nonrotatably in the collar bushing. This transmission rod 23 leads to the second detent fitting of the vehicle seat.

The release adapter 24 forms a continuation of the transmission rod 23 and is adjacent to the collar bushing 22. This release adapter extends over a certain length of the transmission rod and is connected nonrotatably to it. The release adapter 24 carries on its outside circumference a sleeve 62; one of the two end surfaces of the sleeve is held by the fitting component 10, while the other end surface is held by a collar 63 on the release adapter 24.

On the outside circumference of the sleeve 62, a disk cam 64, a locking disk 65, and a link disk 66 are provided. Between the disk cam 64 and the movable component 12 of the fitting rests the base plate 29, which is attached to the stationary component 10.

The disk cam 64 carries a radially oriented, segment-like extension 68, in which a tooth-like opening 69 is provided. A tooth 70 of a blocking catch 71 engages in this opening 69. The blocking catch is supported with freedom to pivot on a retaining stud 72; the retaining stud 72 itself is permanently attached to the base plate 29.

It should also be mentioned here that the disk cam 64 has a bent section 73, which serves as the support point for a tension spring 74. The other support point of the tension spring 74 is on an extension 75 of the link disk 66.

The link disk 66 is provided with a connecting guide 76, in which the stud 35 of the detent pawl 34 engages. The detent pawl 34 is mounted on the bearing journal 33 with freedom to pivot. This bearing journal 33 is attached to the disk cam 64. As a result of the tension spring 74, the link disk and the disk cam are pulled in opposite directions, so that the stud 35 is held in the home position at one end of the connecting guide 76. The detent pawl 34 is provided with the toothed claw 36. This toothed claw 36 engages in the radial teeth 77 of the locking disk 65.

In the home position of the stud 35 in the connecting guide 76, the teeth of the toothed claw 36 engage with the radial teeth 77. In the other end position of the stud 35, the toothed claw is disengaged from the radial teeth 77. The memory device, namely, the locking disk and the pivoting component of the fitting, can be adjusted in common, because the locking disk 65 carries on its circumference an opening 78, into which a locking part 79 of the attachment plate 13 engages. When the backrest is pivoted, therefore, the locking disk 65 is carried along also. When the memory device is adjusted, there is no accompanying rotation of the disk cam 64 or of the link disk 66. When the link disk 66 rotates, only the locking disk 65 and the component 12 of the fitting are enabled to pivot.

In the case of the free-pivoting mechanism, the disks 64, 65, and 66 rotate concomitantly.

Between the collar 63 of the, release adapter 24 and the link disk 66, the disk-like crank 43 is provided. This crank carries on the finger 44 the attachment point 60 for the operating element 45, which is provided to allow the backrest to pivot freely.

In this exemplary embodiment, the crank 43 is also provided with a projecting area 80, to which a coupler 81 is attached with freedom to rotate. At its second attachment point, the coupler 81 is hinged to a retaining stud 82, which is itself attached to the blocking catch 71.

The crank is acted on by a spring, because the spring-loaded release adapter 24 is turned when rotational movement occurs. The spring element 50 exerts force on the release adapter in the direction toward its home position. This spring-loading, acting via the coupler 81, pulls the tooth 70 back into the tooth-like opening 69 when the tooth arrives at the opening during the backward pivoting movement.

As already mentioned, the release adapter 24 is also subjected to the force of this stored-energy device. The stored-energy device is formed by the spring element 50 of the backrest adjustment system. This is explained in the following. When the operating device 45 is actuated, the crank 43 turns. For this purpose, a driver stud 61 is provided at the base of the driver finger on the crank 43. When the crank 43 rotates, the driver stud 61 (release cog in the case of the exemplary embodiment according to FIGS. 1–9) strikes an extension 83 of the release adapter collar 63. As a result, the release adapter 24 rotates along with the transmission rod 23. As a result of the rotation of the cam disk 21 (FIG. 2A), the spring element 50 is put under tension and the backrest adjustment system is unlocked.

The collar 63 of the release adapter 24 is also equipped with a radially oriented extension 83. This extension carries an arc-shaped opening 84. A projection 85 (release finger in the first exemplary embodiment) of a plate-shaped intermediate element 86 mounted nonrotatably on the actuating lever 27 engages in this opening 84. When the actuating lever 27 pivots, the projection 85 slides in the arc-shaped opening 84 in the release adapter and rotates this adapter while putting the spring element 50 under tension and releasing the backrest adjustment system.

A stop 87 is provided on the end of the intermediate element 86 opposite the projection 85. The stop 87 works together with a driver lever 95, formed as an angle lever 88, which is mounted with freedom to pivot on the stud 72 for the blocking catch 71. The angle lever 88 has a control surface 89 and also a locking surface 90 on its sidepiece 91. The other sidepiece 92 is provided with a locking receptacle 101.

When the actuating lever 27 with the intermediate element 86 is rotated, the stop 87 comes to rest against the control surface 89. The angle lever 88 executes a rotational movement of such a kind that the locking receptacle 101 of the second sidepiece 92 rests against the retaining stud 82 of the coupler 81, so that the coupler 81 cannot move the retaining stud 82 or the blocking catch 71. In this way, the movement of the operating element 45 is blocked or, in other words, there is no longer any freedom to pivot.

A wing spring, one end of which acts on the angle lever 88 while the other acts on the blocking catch 71, provides the angle lever with a preferred position. In other words, when the actuating element is released, the stop 87 moves away from the control surface 89.

It remains to be added here only that the sidepiece 91 of the angle lever 88 also carries a shoulder 93 facing the link disk 66; this shoulder works together with an elevation 94 on the link disk 66 in such a way that, when the actuating lever 27 is moved, the link disk is turned via the control surface 89 as the tension spring 74 is pulled. The connecting guide thus also moves, and the detent pawl 34 becomes disengaged from the teeth 77 of the locking disk 65. When the backrest pivots, the memory device can now store a new position (release of the locking disk by the detent pawl, concomitant rotation of the locking disk, then engagement of the detent pawl with the teeth of the locking disk.)

A strong spring exerts a force between the stationary component 10 of the fitting and the pivoting component 12. This force acts in the direction of the forward-pivoting of the backrest, which means that, as soon as the operating element 45 for the free-pivoting action is actuated, the spring tries to push the backrest forward, toward the seat.

This spring exerts a force on the pivoting component 12 of the fitting and on the stationary component 10 even if the memory device has been actuated, which means that the user, while sitting in the seat, can change the adjustment of the backrest by pulling on the actuating lever and then bending his upper body forward or back. When the actuating lever 27 is released, this position remains stored in the memory device.

When the operating element 45 is moved, the blocking catch 71 is pivoted. The angle lever 88 follows along with this pivoting movement, so that now the stop 87 of the intermediate element 86 comes to rest against the locking surface 90, which means that it is no longer possible to adjust the backrest by means of the actuating lever 27. The setting of the memory device cannot be changed.

Figure 12:
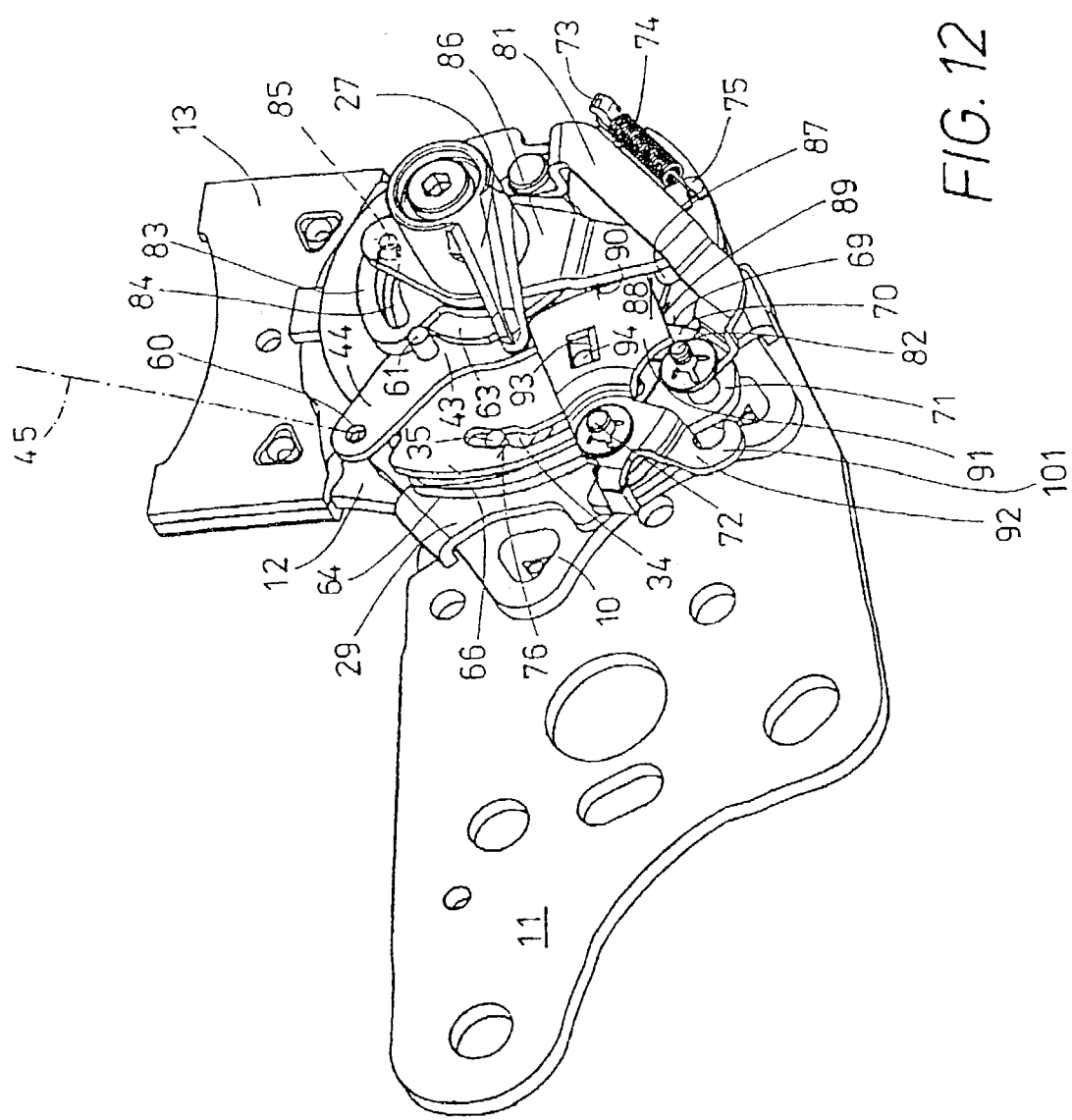
FIG. 12 shows a perspective view of the detent fitting.
Figure 13:
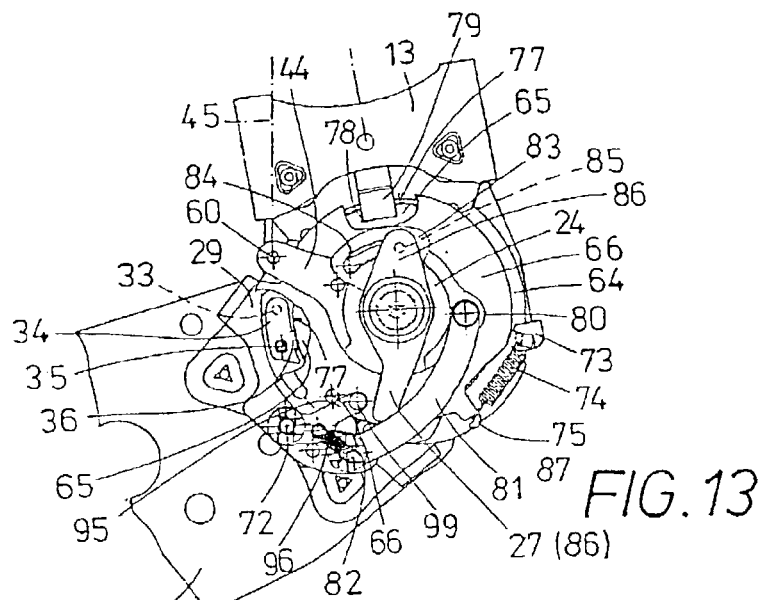
FIG. 13 shows the home positions of the actuating lever and of the operating element in another exemplary embodiment of the detent fitting.
Figure 14:
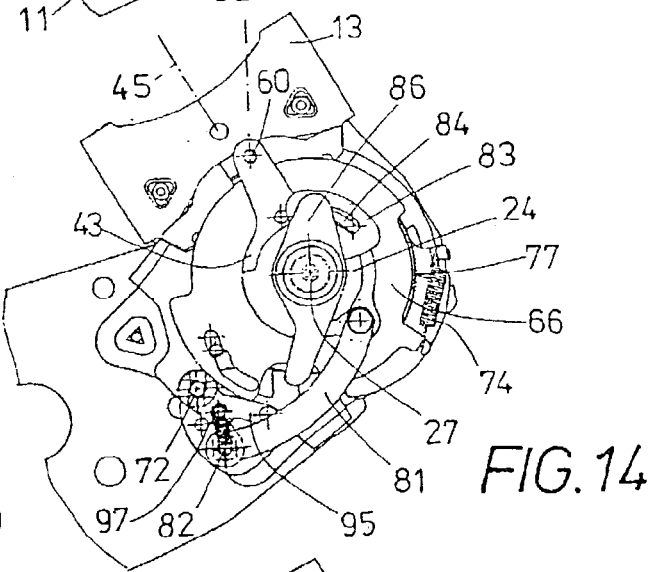
FIG. 14 shows the detent fitting in a free-pivoting position.
Figure 15:
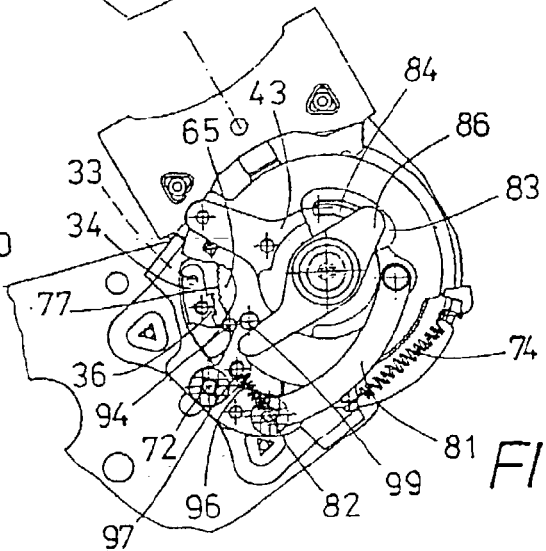
FIG. 15 shows the detent fitting in a backrest adjustment position.

In the exemplary embodiment according to FIGS. 13–15, a simple pivoting driver lever 95 is provided instead of the angle lever 88 on the retaining stud 72 of the blocking catch 71 (FIGS. 10–12); this lever is pulled by a tension spring 96 toward the retaining stud 82 of the blocking catch 71 and the coupler 81. The other end of the tension spring is attached to the driver lever at a retaining point 97. The lever 95 is therefore always under load in the direction toward the retaining stud 72. This driver lever 95 also has a stud 99. This stud is in the path of movement of the intermediate element 86 of the actuating lever. When the actuating lever moves further onward, the driver lever rotates, strikes the elevation 94 on the link disk, and rotates the link disk, so that the toothed claw 36 of the detent pawl 34 becomes disengaged from the radial teeth 77 of the locking disk 65.

In this position, upon actuation of the operating element 45, the coupler 81 can guide the tooth 70 out of the tooth-like opening only when the force of the tension spring 96 is overcome. Another way of saying the same thing is that, when the backrest is freely pivoting and the operating element is actuated, the driver lever with the elevation is not in the path of movement of the intermediate element, which means that the detent pawl is not actuated.

Figure 10:
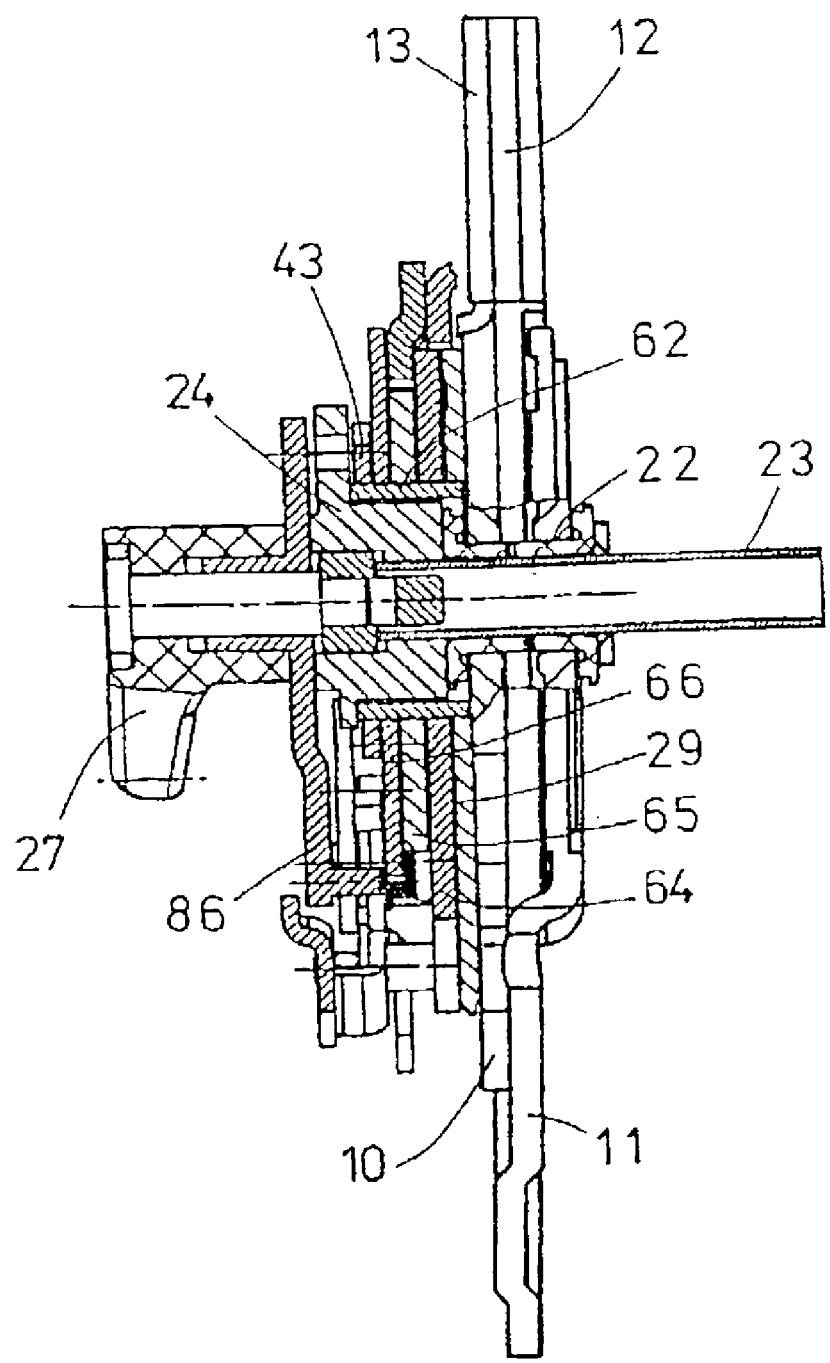
FIG. 10 shows a cross section of another exemplary embodiment of the detent fitting.
Figure 11:
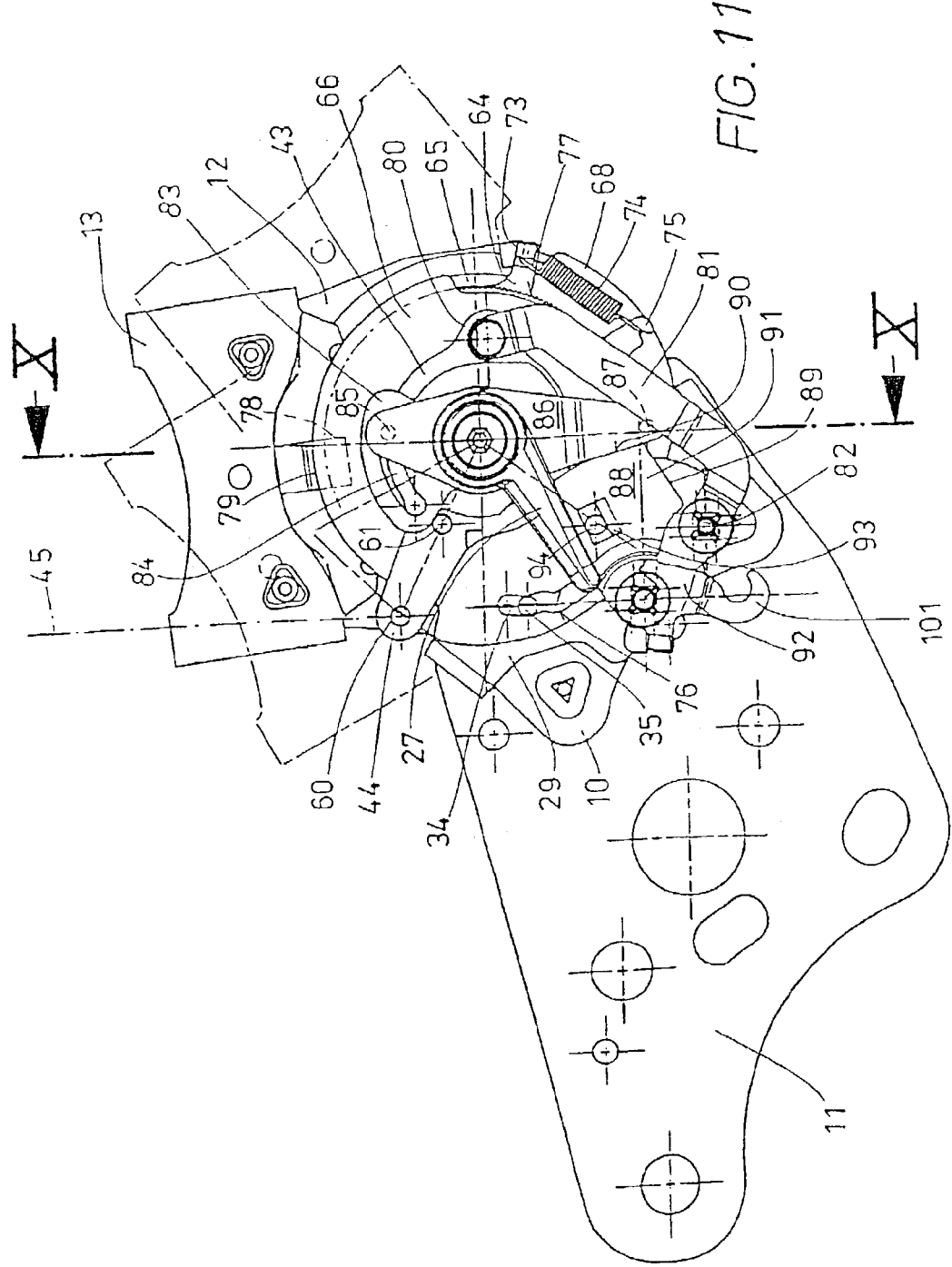
FIG. 11 shows a side view of the detent fitting.

The difference between the exemplary embodiment of FIGS. 10–12 and that of FIGS. 13–15 consists essentially in that the special angle lever 88 is replaced by a driver lever 95 of the general known design.

FIG. 13 shows the home position of the detent fitting. Again, in the home position, the tooth 70 of the blocking catch 71 is resting in the tooth-like opening 69 in the disk cam 64. In addition, the toothed claw 36 of the detent pawl 34 is resting against the radial teeth 77 of the locking disk 65. The pivoting component 12 of the fitting (backrest) is immovable with respect to the fixed component 10 (the seat part of a vehicle seat).

In FIG. 14, the operating element 45, which is attached to the backrest, has been actuated. As a result, the driver stud 61 of the crank 43 pivots the adapter extension 83 with the arc-shaped opening. The projection 85, which is attached nonrotatably to the actuating lever 27 of the mounted intermediate element 86, engages in this opening.

As in the previous exemplary embodiment, the crank 43 is provided with the projection 80, to which the coupler 81 is attached in the manner of a rotary joint. The second hinge point of the coupler is on the retaining stud 82, this stud 82 being attached to the blocking catch 71, so that, when the coupler 81 moves, the tooth 70 of the blocking catch 71 disengages from the tooth-like opening 69 in the disk cam. Now the pivoting component 12 can be pivoted with respect to the stationary component 10. The backrest can be moved toward the seating surface of the vehicle seat, while a strong spiral spring automatically pushes the seat part forward. The tooth 70 slides along the lateral surface of the disk cam 64 during this pivoting motion.

In this exemplary embodiment, as already mentioned, the operating element can be let go without interfering with the ability of the backrest to pivot freely.

The backward movement can also be initiated. This proceeds until the tooth of the elastically supported blocking catch engages in the tooth-like opening 69. If force is exerted on the operating element again, the backrest can be moved toward the rear seat of the vehicle, for example. Of course, the operating element can also be held in the pulled position during the backward movement.

It should also be remarked here that the retaining stud 82 carries a tension spring 96, the other end of which is attached to a mounting point 97 on the driver lever 95. During the pivoting movement of the blocking catch 71, the driver lever 95 is moved out of the path of motion of the actuating lever 27, so that is no longer possible to change the memory setting of the backrest of the motor vehicle seat.

When, after the operating element 45 has returned to its home position shown in FIGS. 1, 11, 12, and 13, the actuating lever 27, which rests against a projection 99 of the driver lever 85, is moved, this lever strikes an elevation 94 on the link disk 66, so that, upon further movement of the actuating lever, the link disk is rotated. The stud 35, which is provided in the connecting guide 76, slides further along in this guide 76 and thus pivots the detent pawl 34, so that the toothed claw 36 of the detent pawl 34 disengages from the radial teeth on the locking disk 65. Now the pivoting backrest can be rotated along with the locking disk 65 in such a way that the toothed catch 36 of the detent pawl 34 engages with a different section of the radial teeth 77 on the locking disk. When the user lets go of the actuating lever 27, the lever pivots into the position shown in FIG. 13.

It can be commented by way of summary that, while the backrest is pivoting freely, the disk cam, the locking disk, and the link disk rotate together, whereas, upon actuation of the actuating lever 27 (adjustment of the memory device), the link disk alone rotates. When the backrest is now pivoted, the locking disk moves along with it, whereas the disk cam and then the detent pawl remain in the positions they have assumed.

Figure 16:
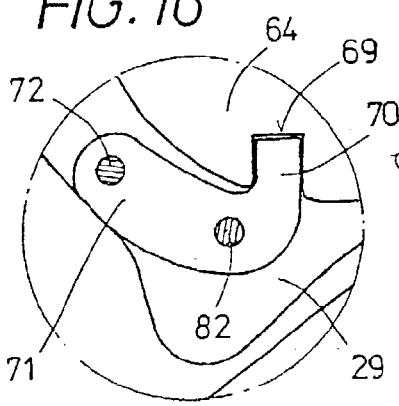
FIG. 16 shows an enlarged view of part of a locking catch.

FIG. 16 shows the engaged position of the tooth 70 in the tooth-like opening 69. This position is considered the home position both for the free-pivoting function and also for the memory device (FIG. 13). Either of the two settings, i.e., either the free-pivoting setting or the memory setting, can then be initiated.

Figure 17:
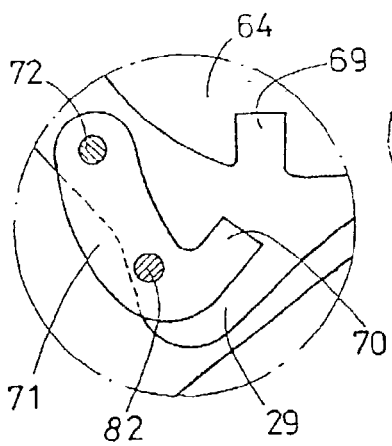
FIG. 17 shows an enlarged view of the locking catch in a different position.

When the operating element 45 is actuated to allow free pivoting, the crank 43 moves and takes the release adapter 24 along with it. The coupler 81 moves the blocking catch 71 into the position shown in FIG. 17 (see FIG. 14). The pivoting component of the fitting and thus the backrest can now be moved in either direction. When the operating element is let go, the tooth 70 drops into the tooth-shaped opening 65 (FIG. 16) during the course of the pivoting movement. As FIG. 14 also shows, The driver lever 95 is not in the path of movement of the actuating lever 27. Proceeding from the home position shown in FIG. 13, the release adapter 24 moves when the actuating lever 27 is actuated. The actuating lever 27 pivots the spring-loaded driver lever 95. This strikes the elevation 94 on the link disk 66 and rotates the disk. As a result of the connecting guide 76, the toothed claw 36 of the detent pawl 34 disengages from the radial teeth 77 on the locking disk 65 (see FIG. 15). The backrest can then be rotated along with the locking disk. When the actuating lever 27 is let go, this position of the backrest is memorized, because the detent pawl engages again with the radial teeth. It would again be possible to allow the backrest to pivot freely, starting from this new position.

The locking disk 65 and the link disk 66 cooperate with the actuating lever 27 to form the primary components of the memory device.

The crank 43, the blocking catch 71 with the tooth 70, and the disk cam 64 cooperate with the operating element 45 to form the primary components of the free-pivoting mechanism.

As already mentioned, the embodiments of the object of the invention shown and described here represent only examples, to which the invention is in no way limited. Thus it is possible to use any type of backrest adjusting device based on a detent fitting in combination with the memory device and the free-pivoting device. In addition, there are also many other types of changes and different designs of the object of the invention which can be imagined. All of the features which can be derived from the specification and from the associated drawings, furthermore, are essential to the invention, even if they have not been explicitly stated in the claims.

LIST OF REFERENCE NUMBERS

10 stationary component of the fitting
11 attachment plate on 10
12 pivoting component of the fitting
13 attachment plate on 12
14 support disk
15 ring-shaped extension
16 guide shoulder on 12
17 locking bolt
18 control stud on 17
19 control slit in 20
20 driver disk
21 cam disk
22 collar bushing
23 transmission rod
24 release adapter
25 release finger on 24
26 release cog on 26
27 actuating lever for backrest adjustment
28 control projection
29 base plate
30 stop disk
31 locking segment on 30
32 end surface of 31
33 bearing journal
34 detent pawl
35 stud on 34
36 toothed claw on 34
37 leaf spring
38 annular spring
39 retaining projection
40 cover plate
41 empty space
42 stop 43 crank
44 driver finger of 43
45 operating element for the free pivoting movement
46 connecting rivet
47 rocker
48 connecting element of 47
49 radial cam on 47
50 spring element
51 arrow
52 locking projection
53 stop angle
54 arrow
60 attachment point for 45
61 driver stud
62 sleeve
63 collar on 24
64 disk cam
65 locking disk
66 link disk
68 segment-like extension
69 tooth-like opening in 64
70 tooth of 71
71 blocking catch
72 retaining stud for 71
72 bent section of 60
74 tension spring 74
75 extension of 66
76 link guide
77 radial teeth on 65
78 opening in 65
79 locking part of 13
80 projecting area
81 coupler
82 retaining stud on 71
83 extension on 63
84 arc-shaped opening
85 projection for 84
86 plate-shaped intermediate member
87 stop on 86
88 angle lever
89 control surface
90 locking surface
91 sidepiece for 89, 90
92 sidepiece of 88
93 shoulder of 91
94 elevation on 66
95 driver lever
96 tension spring
97 attachment point
99 projection on 95
101 locking receptacle

The invention claimed is:

1. A detent fitting for a vehicle seat, especially for a seat of a motor vehicle, the fitting including a first, stationary component (10) belonging to a part of the seat and a second component (12), which is pivotably supported with respect to the stationary component and which belongs to a backrest of the seat, at least one locking pawl (17) is mounted on one of the two components so as to be movable into and out of locking engagement in a radial direction with another of the two components, which pawl cooperates with cams to form a backrest adjusting mechanism (17, 20, 21), which is in working connection with an actuating lever (27), wherein the backrest adjusting mechanism is operatively connected to a memory device (30, 31, 34, 37; 34, 65, 66) for storing a desired, adjustable backrest tilt angle and a free-pivoting mechanism (43, 47; 64, 70, 71), which is releasable by a separate operating element (45), the backrest adjusting mechanism (17, 20, 21) being arranged between the two fitting components (10, 12), the first fitting component (10) being arranged on a side of the backrest adjusting mechanism facing the actuating lever (27) and having an inside surface facing the backrest adjusting mechanism and an outside surface facing away from the backrest adjusting mechanism, the memory device (30, 31, 34; 37, 34, 65, 66) and the free-pivoting mechanism (43, 47; 64, 71) being provided on the outside surface of the first fitting component (10).

2. The detent fitting according to claim 1, wherein the memory device (30, 31, 34, 37; 34, 65, 66) and the free-pivoting mechanism (43, 47; 64, 70, 71) are attached as a unit to the outside surface of one of the fitting components (10, 12).

3. The detent fitting according to claim 1, wherein the memory device is formed by a stop disk (30; 65) and a rotatably supported detent pawl (34), which holds the disk in place, wherein the rotatably supported detent pawl (34), which is preloaded in the locking direction, can be unlocked by the actuating lever (27), which also releases the backrest adjusting mechanism.

4. The detent fitting according to claim 3, wherein the stop disk (30) is preloaded by an stored-energy device in the forward pivoting direction of the backrest, and in that the detent pawl (34) is rotatably supported in a permanent position with respect to the stationary component (10) of the fitting and is spring-loaded in the locking direction.

5. The detent fitting according to claim 3, wherein the actuating lever (27) is connected to a release adapter (24), and the release adapter (24) is connected nonrotatably to the cams (22, 23) of the backrest adjusting mechanism (17, 20, 21).

6. The detent fitting according to claim 5, wherein a stop (85), which can be brought into contact with the release adapter (24) and which serves as a release finger (25), is mounted nonrotatably on the actuating member (27), and a crank (43), which can be actuated by a separate operating element (45), has a driver stud (61) serving as a release cog (26), which acts on the release adapter (24).

7. The detent fitting according to claim 6, wherein the actuating lever (27) has a control projection (28), which, during the release movement, moves a rocker (47) hinged to a crank (43) so as to release the detent pawl (34), which is in working connection with the rocker (47).

8. The detent fitting according to claim 6, wherein the backrest adjusting mechanism (17, 20, 21) can be unlocked upon movement both of the actuating lever (27) and of the operating element (45).

9. The detent fitting according to claim 6, wherein a pivoting driver lever (88, 95), which can assume any one of three positions, the three positions including two different locking positions and a home position, locks one of the adjusting movements of the free-pivoting mechanism or the memory device, when in an associated locking position, whereas, when the lever is in the home position, the lever actuates either the free-pivoting mechanism or the memory device.

10. The detent fitting according to claim 9, wherein the driver lever (88, 95) is supported pivotably on a retaining stud (72) belonging to the stationary component (10) of the fitting.

11. The detent fitting according to claim 9, wherein the driver lever (95) is designed as an angle lever (88) with two sidepieces (91, 92), one of which sidepieces (91) blocks movement of the free-pivoting mechanism, while the other sidepiece (92) blocks movement of the memory device.

12. The detent fitting according to claim 11, wherein a disk cam (64), a locking disk (65),and a link disk (66), are provided axially next to each other on a rotational axis of the backrest for control of the free-pivoting mechanism and the memory device; the locking disk (65) is connected nonrotatably to the pivoting component (12) of the fitting, and has a circumference provided with a set of teeth (77), with which a toothed claw (36) on a pivoting detent pawl (34) engages; the disk cam (64) has a bearing journal (33) for the detent pawl (34) on one side and a opening (69) on another side, in which a tooth (70) of a blocking catch (71), which can pivot around a retaining stud (72) assigned to the stationary component (10), engages; and the link disk (66) is equipped with a link guide (76), in which a stud (35) of the detent pawl (34) engages, where the link disk (66) and the disk cam (64) are spring-loaded (74) for rotation in opposite directions.

13. The detent fitting according to claim 12, wherein the link disk (66) has an elevated portion (94), against which the projection (93) of the driver lever (88, 95) comes to rest, so that when the driver lever pivots, the link disk (66) is rotated with respect to the cam disk (64).

14. The detent fitting according to claim 13, wherein, when the backrest is in a freely pivoting state and the operating element (45) is released, the tooth (70) of the blocking catch (71) rests under spring-loaded pretension on a circumferential surface of the disk cam (64).

15. The detent fitting according to claim 14, wherein the blocking catch (71) has a retaining stud (82), to which a coupler (81) is hinged, which can be actuated by the operating element (45), acting by way of the crank (43).

16. The detent fitting according to claim 15, wherein the retaining stud (82) serves as a stop for the second sidepiece (92) of the angle lever (88) to block the movement of the blocking catch (71).

17. The detent fitting according to claim 16, wherein the pivoting blocking catch (71) and the driver lever (95) are held against each other by a spring (96).

18. The detent fitting according to claim 17, wherein the driver lever (88) has a guide surface (89), which concomitantly moves the elevated portion (94) on the link disk (66) when the actuating lever (27) is moved.

19. The detent fitting according to claim 18, wherein, when the actuating lever (27) is moved, the stop (87) for the memory device pivots the driver lever (88, 95) and thus rotates the link disk (66), and simultaneously the projection (85) on the intermediate lever (86) of the actuating member moves the release adapter.

20. The detent fitting according to claim 5, wherein the memory device is formed by a locking disk (65) and a rotatable link disk (66), which controls the detent pawl (34), where the locking disk (65) can be moved jointly with the pivoting component (12).

21. The detent fitting according to claim 20, wherein the pivoting motion of the detent pawl (34) can be controlled via the rotating link disk (66), in which case a stud (35) located at a point remote from bearing point (33) of the detent pawl (34) engages in a link guide (76) provided on the link disk (66).

22. The detent fitting according to claim 21, wherein the link disk (66) and a disk cam (64), which has the pivoting bearing point (33) for the detent pawl (34), are held under tension in opposite directions of rotation by a spring (74).

23. The detent fitting according to claim 20, wherein the actuating lever (27) carries nonrotatably an intermediate part (86) with a projection (85), which engages in an arc-shaped opening (84) in an extension (83) of the release adapter (24) so as to rotate the release adapter concomitantly, and the intermediate member (86) has a stop (87), which moves a driver lever (88, 95), by means of which the link disk (66) can be rotated.

24. The detent fitting according to claim 3, wherein the actuating lever (27) has a nonrotatable stop (87) serving as a control projection, which, during the release movement, acts on a driver lever (88, 95) to move a link disk (66) in the direction of the release of the detent pawl (34).

25. The detent fitting according to claim 3, wherein the detent pawl (34), which is supported pivotably on the disk cam (64), has a stud (35), which engages in a link guide (76) of a link disk (66), the link guide thus pivoting the detent pawl (34) into a replaced position.

26. The detent fitting according to claim 1, wherein a release finger (25), which can be brought into contact with the actuating lever (27), and a release cog (26), which can be acted upon by a crank actuated by a separate operating element (45), are mounted on the release adapter (24).

27. The detent fitting according to claim 1, wherein the detent pawl (34), which is pivotably supported on a base plate (29) connected to the stationary component (10) of the fitting, has a stud (35), which engages in a connecting element (48) of the rocker (47), the rocker having a radial cam (49), by means of which the control projection (28) of the actuating lever 927) releases the detent pawl (34) during the release stroke.

28. The detent fitting according to claim 1, wherein the base plate (29) has a retaining projection (39) for limiting the pivoting movement of the stop disk (30) in the forward direction which occurs as a result of the spring-loading of the disk.

29. The detent fitting according to claim 1, wherein the detent pawl (34), which is supported on the base plate (29); the stop disk (30), which is held by the pawl in the locked position; and the stored-energy device, which is designed as an annular spring (38), which holds the stop disk (30) under spring tension, are arranged in an empty space (41) formed between the base plate (30) and a cover plate (40), where the cover plate (40) is connected to the fitting component (12) belonging to the backrest.

30. The detent fitting according to claim 1, wherein the cover plate (40) has a stop (42) projecting into the pivoting path of the stop disk (30) to carry the stop disk (30) along with the cover plate (40) agains the load being exerted on the stop disk (30) by the stored-energy device when the backrest is being pivoted backward to the desired tilt angle for the purpose of setting the memory.

31. The detent fitting according to claim 1, wherein the stop disk (30) has an externally toothed locking segment (31), the radially inward-directed end surfaces (32) of which form contact shoulders for the retaining projection (39) of the base plate (29) on one side and for the stop (42) of the cover plate (40) on the other.

32. The detent fitting according to claim 1, wherein, starting from a home position, locking means (88, 95, 90, 101; 71, 81, 82) are provided so as to selectively release only one actuating movement either for the memory device or for the free-pivoting mechanism.

33. The detent fitting according to claim 1, wherein, when the backrest is freely pivoting and then load is exerted on the operating element (45), the backrest of the vehicle seat can be moved beyond the selected memory position to any point within a pivoting range.

* * * * *